(12) United States Patent
Hermey et al.

(10) Patent No.: US 6,796,409 B2
(45) Date of Patent: Sep. 28, 2004

(54) GUIDE TROUGH

(75) Inventors: Andreas Hermey, Hennef (DE); Claus Seubert, Köln (DE); Gunter Blase, Bergisch Gladbach (DE)

(73) Assignee: IgusSpritzguBteile fur die Industrie GmbH, Köln (DE)

( * ) Notice: Subject to any disclaimer, the term of this patent is extended or adjusted under 35 U.S.C. 154(b) by 0 days.

(21) Appl. No.: 10/059,643

(22) Filed: Jan. 29, 2002

(65) Prior Publication Data
US 2002/0136471 A1 Sep. 26, 2002

(30) Foreign Application Priority Data
Jan. 30, 2001 (DE) .......................................... 201 01 656

(51) Int. Cl.[7] .............................................. H02G 11/00
(52) U.S. Cl. ..................................... 191/12 C; 384/26
(58) Field of Search .......................... 191/12 C; 384/26, 384/22, 41, 42

(56) References Cited

U.S. PATENT DOCUMENTS

| 5,178,247 | A  | 1/1993 | Vagaggini | 191/12 C |
| 6,119,836 | A  | 9/2000 | Blase | 191/12 |
| 6,270,258 | B1 | 8/2001 | Blase | 384/26 |
| 6,536,063 | B1 | 3/2003 | Blase | |

FOREIGN PATENT DOCUMENTS

| DE | 29706670 | 7/1997 | |
| DE | 19710450 | 6/1998 | ........... F16G/13/16 |
| DE | 19730548 | 12/1998 | |
| DE | 20101656 | 5/2001 | |
| WO | WO9740289 | 10/1997 | ........... F16G/13/16 |
| WO | WO9954640 | 10/1999 | ........... F16G/13/16 |

*Primary Examiner*—Lenard A Footland
(74) *Attorney, Agent, or Firm*—Grossman Tucker Perreault & Pfleger, PLLC

(57) ABSTRACT

The invention relates to a guide trough for energy guiding chains, where the guide trough has parallel lateral guide elements and bottom guide elements, where the lateral guide elements are spaced apart laterally, where an energy guiding chain can be arranged in the guide trough and deposited between the lateral guide elements and on the bottom guide elements, and where a support structure with support elements is provided, on which the guide elements can be mounted, and where mounting devices for mounting the support elements on an essentially vertical surface are provided. In order to devise a guide trough which is of simple design and can be mounted on a vertical surface with minimal assembly, a guide trough is provided in which the support elements, and at least one guide element, selected from the group consisting of lateral and bottom guide element, have corresponding, integrally moulded means for mounting on one another. The mounting means can be designed as a projection extending over the entire length of the guide elements.

20 Claims, 6 Drawing Sheets

Figure 1:
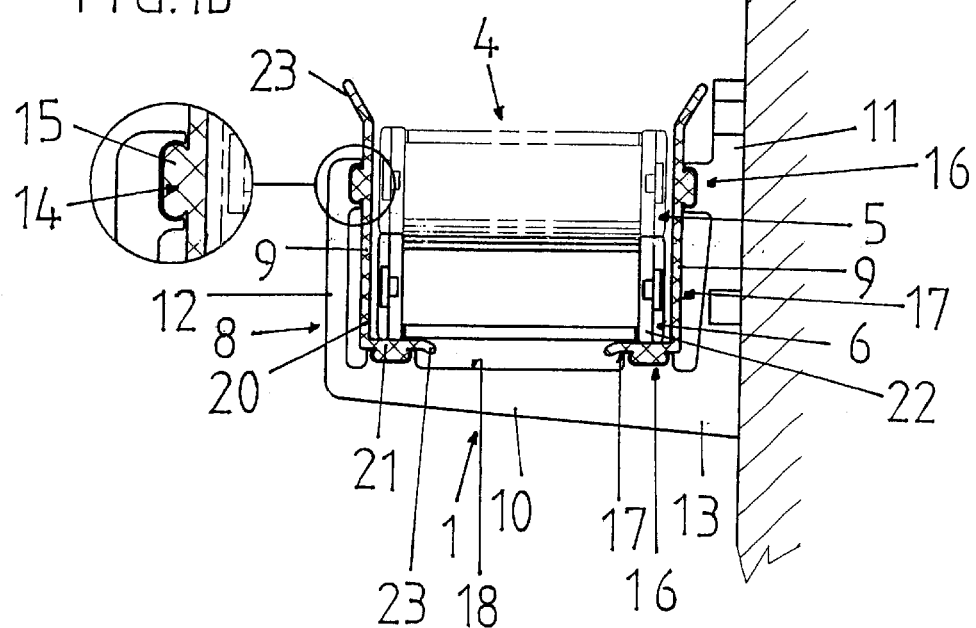

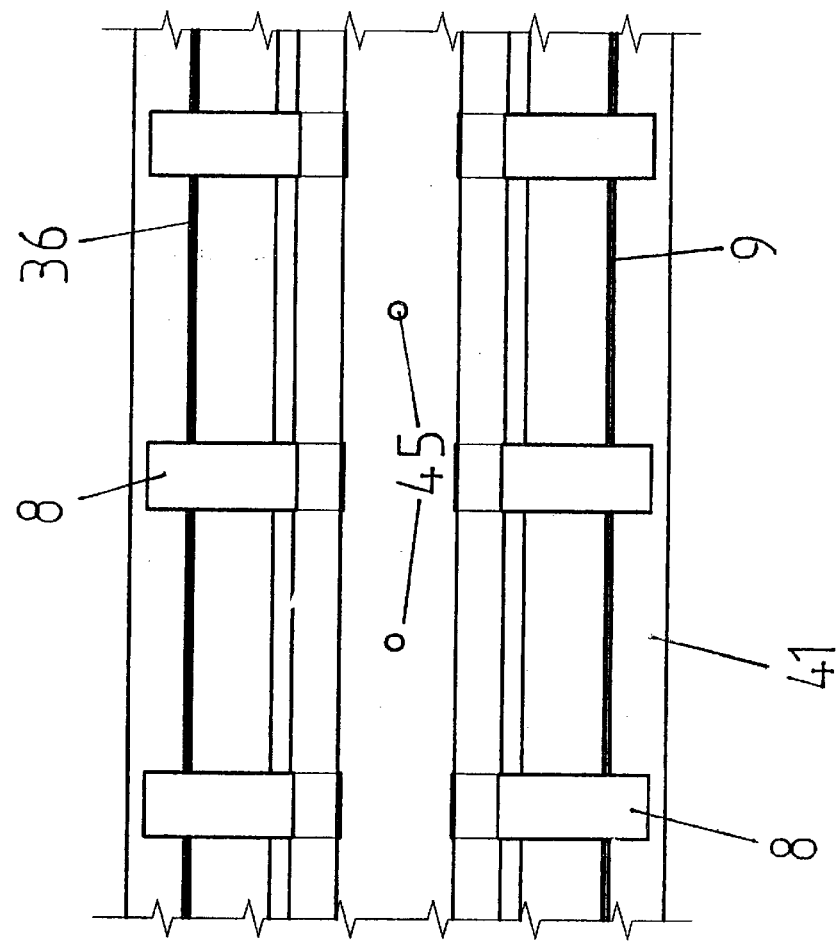
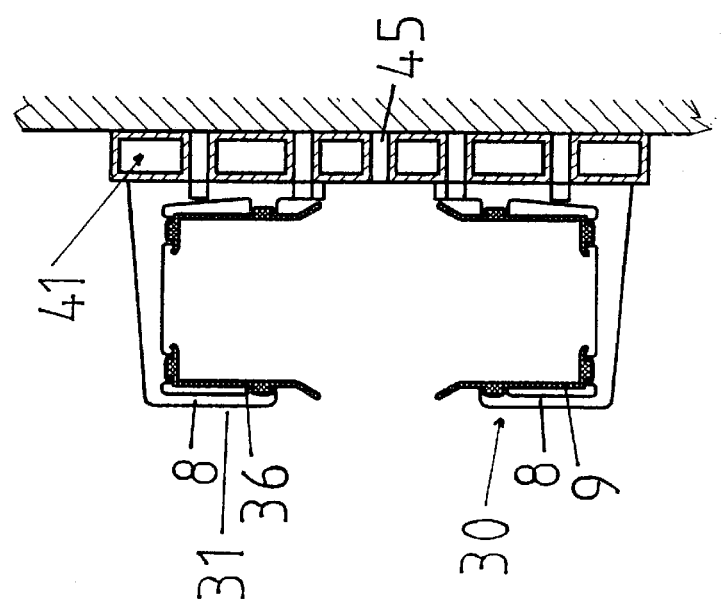

GUIDE TROUGH

The invention relates to a guide trough for energy guiding chains, where the guide trough has parallel lateral guide elements and bottom guide elements, between or on which the energy guiding chain can be deposited, and a support structure with support elements which support the guide elements and on which the guide elements are mounted, where mounting devices for mounting the support elements on an essentially vertical surface are provided.

Generic guide troughs are available for specific applications in which the guide troughs must be mounted on essentially vertical surfaces, such as walls, beams or the like. Conditions of this kind exist, for example, when energy guiding chains are used in crane systems—without being restricted to this application—where the energy guiding chains are deposited in loop-shaped fashion, forming an upper strand, a lower strand and a deflection zone.

Up to now, guide troughs have been mounted on the vertical surface by first mounting a support structure on the vertical surface, which projects outwardly from the side of the wall or beam, and whose width is at least equal to that of the guide trough. A conventional guide trough, the bottom of which can be mounted on a base structure, is then screwed to the support structure. The mounting of guide troughs of this kind is very time-consuming and work-intensive, because both the support structure must be screwed tight on the vertical surface and the guide trough on the support structure in a time-consuming procedure. Moreover, both the support structure and the guide trough must be aligned in relation to the envisaged travel path of the energy guiding chain.

Consequently, the object of the invention is to devise a guide trough which is of simple design and can be mounted on a vertical surface with minimal assembly.

The object is solved in that corresponding means for the preferably detachable mounting of the guide elements are integrally moulded on the support elements and on the lateral and/or bottom guide elements. These means are integrally moulded on at least one, but preferably all guide elements of the guide trough. The mounting means integrally moulded on the support and guide elements greatly simplify assembly. In this context, the mounting means are preferably designed such that the assembly of the support elements already aligns the mounting areas for the guide elements and defines their position relative to the vertical surface.

The support elements preferably have at least one, essentially vertical rest for at least one of the lateral guide elements, thus already providing one lateral mount for the guide trough and further simplifying mounting and alignment of the guide elements.

The length of the support elements in the longitudinal direction of the guide trough is preferably small compared to the length of the guide elements, and particularly preferably small compared to the width of the guide trough. However, the length of the support elements can also be in the region of the length of the guide elements, or also exceed it. The length of the guide elements preferably amounts to a multiple of the width of the guide trough. The width of the support elements is preferably equal to that of the guide trough, so that the support elements support the guide elements over their entire width. However, the width of the support elements can also be smaller.

The support elements can be mounted indirectly or directly on the vertical surface.

The support structure preferably has multiple, preferably 3 to 5 or more, support elements, which are each associated with one guide element, arranged to face one another, and spaced apart in the longitudinal direction of the guide trough. The width of the support elements can be essentially equivalent to, or smaller than, the width of the mounting areas associated with the vertical surface. In particular, the support elements can be created by shortening a long profile, where only the mounting areas associated with the vertical surface, e.g. through-holes or blind holes, must be moulded.

The support elements are preferably of one-part design, although they can also be of multi-part design, if necessary, and have separate vertical rests, for example. In this case, the means for connecting the parts of the support elements to one another are preferably integrally moulded on them. In order to adapt the support elements to different dimensions of the energy guiding chain (e.g. width and/or height of the same) and/or different inclinations of the essentially vertical mounting surfaces, the support elements can have adjustors for changing the dimensions and/or geometry of the same, or suitable adapters or spacers.

It should be understood here that the mounting means for connecting the support elements to the guide elements, and/or the parts of the support elements to one another, preferably consist exclusively of mounting means that are integrally moulded on them.

The at least one vertical rest on the support elements for the guide elements can be provided on the side of the support elements facing towards or away from the vertical surface. Vertical rests for the guide elements facing towards and away from the vertical surface are preferably provided, which are preferably integrally moulded on the support element, without being restricted to this.

The support elements preferably have a mounting area, which is at an angle to the support area located underneath the guide elements, is used to fix the support element to the vertical surface, advantageously extends in the direction of the guide elements, and preferably also forms a lateral rest for the at least one, associated guide element. Thus, the support element is preferably of essentially L, Z or U-shaped design, meaning that the support element preferably has one or two side legs, where one of the end legs can be mounted on the vertical surface.

In the case of a support element with a U-shaped profile, in particular, but also in the case of other profiles with two side legs, the two side legs can be of different heights. The longer side leg is preferably provided with mounting means for mounting the support element on the vertical surface. Mounting means of this kind can be designed, for example, as through-holes or blind holes for accommodating separate mounting means, such as screws or the like, where other suitable mounting means can also be provided.

Regardless of the shape of the support element, one or both of its lateral rests for the guide elements can be lower than the guide trough. Thus, the lateral guide elements of the guide trough are preferably higher than the side legs of the support elements. The vertical rests preferably extend over more than half, e.g. $2/3$ or more, of the height of the guide elements.

The mounting means for the guide elements on the support elements are preferably designed as corresponding projections and recesses. For example, the mounting means can be designed as positive and/or non-positive connectors, particularly as snap elements, where mounting can be achieved by inserting the guide elements into the support elements. The direction in which the elements are to be moved towards one another for mounting can correspond to the longitudinal direction of the guide trough, or a direction perpendicular to it, without being restricted to this. If necessary, the guide elements can also be mounted on the support elements by means of (e.g. lateral) pivoting motion, where the projections are inserted into the corresponding recesses by means of this motion and can thus be mounted on the support elements in detachable fashion. If necessary, the mounting means can also be designed in some other suitable manner. The means for mounting the support and guide elements to one another can simultaneously ensure the non-shift positioning of the guide elements on the support elements or, if necessary, separate anti-shift elements can be provided.

The guide elements are preferably provided with externally arranged projections protruding from the sides and/or bottom, which engage corresponding recesses in the support elements. The projections can extend over the entire length of the guide elements or over part of the length. The projections can each have a thickness that enables them to simultaneously act as reinforcing ribs, where the thickness of the ribs can be greater than half the thickness, or greater than the full thickness of the support elements, without being restricted to this. The lateral extension of the projections can be somewhere between half the wall thickness and the full wall thickness of the guide elements, or greater than the wall thickness, without being restricted to this. The mounting projections of the guide elements can have an essentially elliptical or oval cross-section. If necessary, several consecutive mounting projections can also be integrally moulded on the guide elements in their longitudinal direction. At least one projection which supports a guided energy guiding chain is preferably provided on a bottom area, and at least one projection which laterally guides a guided energy guiding chain on a lateral guide area of the guide element.

In terms of their height and/or width, the guide elements preferably extend in one piece over the entire area of the guide trough that accommodates the energy guiding chain, where the guide trough is positioned below or above the energy guiding chain, so that the side and/or bottom or top of the energy guiding chain is partially or fully guarded and guided by the guide elements. In this context, the lower region of the energy guiding chain is formed by the lower strand and possibly the upper strand deposited on it. The upper region is formed by the highest point of the deflection zone of the energy guiding chain, or by its self-supporting upper strand. The guide elements—possibly several arranged consecutively and separated by spacers, or preferably in contact with one another on their face ends sides— preferably form a closed side wall and/or a bottom or top wall over the entire length of the guide trough. Thus, the height of the guide elements preferably exceeds the combined height of the upper and lower strand.

In particular, the guide elements can have an essentially L-shaped cross-section, where the cross-section of the guide trough is formed by two directly adjacent or laterally separated guide elements, the bottom legs of which can point towards one another. The guide elements are preferably of U-shaped design, so that they guide the energy guiding chain on both sides, as well as on the bottom. However, several lateral guide elements, separated from one another in the vertical and/or lateral direction, can also be provided, if necessary.

The mounting projections for connecting the guide elements to the support elements can be provided on one of the lateral guide elements, preferably on its upper half, and adjacent to the lateral guide elements on the bottom. As a result, both L and U-shaped guide elements can be securely fastened to the support elements.

The mounting means of the guide and cover elements on the support elements are preferably arranged on the vertical surface or a mounting profile in vertically offset fashion relative to the mounting means or positions of the support elements.

The mounting means of the support elements and/or the guide elements preferably project towards one another, so that the outside surfaces of the guide elements can be mounted on the support elements at a distance from them. As a result, except in the mounting areas, slot or slit-shaped spaces are formed between the guide and support elements, which can compensate for manufacturing tolerances and also dampen the noise generated by the travel motion of the energy guiding chain.

The bottom mounting means of the guide elements are preferably designed as strips extending in the longitudinal direction of the guide trough and arranged at the height of the side sections of the travelling energy guiding chain. In this context, the transverse extension of the projections preferably essentially corresponds to the width of the side sections of the energy guiding chain, or its contact surface on the guide elements, without being restricted to this. Guide elements of different widths and/or heights are preferably provided, which can be interchanged at will and mounted on the same support elements. The mounting means of the different guide elements can thus, for example, be arranged at the same vertical height and/or the same width, referred to a reference point on the guide trough. If necessary, several vertically and/or laterally separated mounting areas can be provided on the support elements and/or guide elements, so that guide elements of different heights and/or widths can be mounted on one and the same given support structure.

The guide elements can be made of a material that is more or less elastically deformable, or essentially rigid under the weight of the guide trough, particularly a plastic material. The support elements are made of an essentially rigid material, such as a plastic material or a lightweight metal, without being restricted to this.

According to an advantageous configuration, the guide trough comprises support elements with associated lateral and/or top cover elements, which preferably have corresponding mounting means integrally moulded on the support and guide elements. The cover elements partially or, preferably, fully cover the side and/or top of the upper region of the energy guiding chain, i.e. the self-supporting upper strand or the top deflection zone, and thus protect it against external influences. Coverage is preferably provided over the entire height and/or width of the strand of the energy guiding chain and over the entire length of the guide trough. The cover elements have only a subordinate guiding function, if any. The support elements and/or the cover elements can be of the same design as the support elements and guide elements associated with the bottom strand of the energy guiding chain, so that all explanations provided in this description also apply accordingly to the support and cover elements associated with the upper strand. In particular, this applies to the design of the respective mounting means.

According to an advantageous configuration, the support elements associated with the lower and upper region of the energy guiding chain to be guided are connected to one another, preferably in one piece, possibly by separate spacers. In particular, a support structure of this kind can be designed as a one-piece, elongated profile, such as an extruded profile or continuous-cast profile.

The distance between the vertically arranged support elements, whose lateral support legs face one another, is preferably such that it is slightly greater than the height of the deflection zone of the energy guiding chain to be guided.

In this context, the areas of the support elements associated with both the upper and lower sections of the energy guiding chain can be equipped with mounting means for connecting the guide trough to the vertical surface.

According to an advantageous configuration, a long mounting profile arranged in the longitudinal direction of the energy guiding chain to be guided is provided, which is designed for mounting a number of support elements arranged in the longitudinal direction of the energy guiding chain. The profile can have preferably integrally moulded mounting devices for mounting on the vertical surface, such as through-holes for accommodating mounting elements, or snap elements, without being restricted to this. The mounting profile can be part of the support elements, or mounted on them in detachable fashion. The mounting profile can be designed for mounting of the support elements associated with the lower and/or upper region of the energy guiding chain to be guided, and thus extend, for example, essentially over the height of the lateral guide elements, or essentially over the total height of the energy guiding chain, i.e. including the deflection zone or a self-supporting upper strand. Because the mounting profile is connected by means of a small number of mounting points on a vertical surface, numerous support elements can be assembled in particularly simple fashion or vertical mounting surfaces bridged.

The long mounting profile is preferably adapted to the path of the guide trough and can be of linear or, if necessary, also curved designed.

The mounting profile can be designed as a hollow profile with an essentially rectangular cross-section, which can have one or more hollow chambers that are closed on all sides and extend in the longitudinal direction of the guide trough. If necessary, the hollow chambers can be of partially open design, e.g. along a side surface extending in the longitudinal direction of the trough. The hollow chambers can be designed to be open at the face end. In particular, the mounting profile can be provided with mounting means, such has through-holes for accommodating screws or other mounting elements arranged on the vertical height between two adjacent hollow profiles. Of course, the mounting profiles can also be of some other suitable design.

At pre-determined points, or at least in sections, the support elements can be shifted on the mounting profiles in the longitudinal and/or transverse direction of the mounting profiles, and they can be mounted in freely selected positions, or a number of pre-defined positions arranged, for example, in the manner of a grid.

In particular, the mounting profile can have mounting areas for mounting the support elements associated with the lower strand and the upper strand of the energy guiding chain to be guided. In this context, the mounting profile can extend over the entire length and/or height of the guide elements or the entire guide trough, or a section of the same. If necessary, several mounting profiles separated from one another can be provided, which have means for being aligned relative to one another.

The support elements and/or the guide elements and/or the mounting profiles of the guide trough can be profiles that can be cut to length as required. In particular, the mounting means for mounting the above components on one another, or the components on the vertical surface, can be designed such that, when cut to length as required or shortened in the region of a length equal to one or more widths of the guide trough, they enable proper mounting of the components on one another or on the vertical surface. For this purpose, the mounting means can, for example, be provided as long profiles or punctiform mounting means, where the distance between the mounting means is equal to roughly the width of the trough, or a small multiple thereof, e.g. two to three times the same. For example, the mounting means of the mounting profile that are associated with the vertical surface can be arranged in the centre between the support elements, which are separated from one another in the longitudinal direction of the guide trough, where the distance between the support elements in the longitudinal direction of the trough is equal to one, two or three times the trough width, without being restricted to this.

In particular, a shortenable profile is provided in accordance with the invention, comprising pre-assembled support elements and guide elements, or support elements, guide elements and mounting profiles. The length of the shortenable profiles can be in the region of one to several meters, e.g. up to six meters. In particular, a prefabricated system consisting of guide profiles and support elements can be provided in accordance with the invention, which also includes a preassembled energy guiding chain, particularly also with preassembled connections for mounting the energy guiding chain or for connecting the lines, cables or the like to be guided by it. In particular, a prefabricated system of this kind can also include a mounting profile.

An example of the invention is described below and explained on the basis of drawings. The figures show the following:

FIG. 1 A cross-section of a guide trough according to the invention (FIG. 1a) and a detail view (FIG. 1b), FIG. 2 A cross-section of a guide trough according to the invention with guide trough sections above and below the energy guiding chain to be guided, FIG. 3 A cross-section of a guide trough according to the invention with U-shaped guide elements, FIG. 4 A cross-section of a guide trough according to the invention with another configuration of the support elements, FIG. 5 A cross-section (FIG. 5a) and a side view (FIG. 5b) of a guide trough according to the invention with mounting profiles, FIG. 6 A cross-section (FIG. 6a) and side view (FIG. 6b) of another configuration of a guide trough according to the invention with a mounting profile.

FIG. 1 shows a cross-section of guide trough 1 according to the invention, which is mounted on wall 2 with vertical surface 3 and serves to guide energy guiding chain 4. In the energy guiding chain according to this practical example, a deflection radius is followed by upper strand 5, which rests on lower strand 6, where the maximum height of the deflection zone is illustrated by energy guiding chain link 7.

Guide trough 1 has a support structure consisting of a number of bracket-shaped support elements 8, which are arranged consecutively in the longitudinal direction of the support structure, are mounted directly on vertical wall 2 in this practical example, and hold in place guide elements 9 extending in the longitudinal direction of the guide trough. Support elements 8 have an essentially horizontal leg 10, which stands essentially perpendicularly on vertical surface 3, and a leg 11 facing vertical surface 3, which is provided with mounting means in the form of through-holes for the accommodation of screws or the like. According to the practical example, leg 11 extends towards guide elements 9 and simultaneously serves to mount and laterally support lateral guide element 9a facing wall 2. In addition, the side of support element 8 facing away from vertical surface 3 is provided with another leg 12, which is angled relative to leg 10, so that guide elements 9b guiding the energy guiding chain are held in place and supported on both sides by support element 8.

Essentially horizontal leg 10 of the support element, which supports the guide trough, has a widened section 13, which faces wall 2 and rests against it.

Support elements 8 are made of an essentially stiff and rigid material, such as an aluminium or plastic profile. According to the practical example, guide elements 9 display a certain degree of elasticity, which still provides sufficiently stable guidance or support for the energy guiding chain and simultaneously displays elastic damping characteristics, in order to enable low-noise motion of the energy guiding chain inside the guide trough.

For the purpose of mounting L-shaped guide elements 9, support element 8, which consists of one piece according to the practical example, is provided on one or both ends of legs 10, 11, 12 with recesses, which interact with corresponding projections integrally moulded on guide elements 9 and thus secure guide elements 9 in positive and/or non-positive fashion. Projections 15 are designed as strips extending over the entire longitudinal direction of the guide elements and they have undercuts which, according to the practical example, are arranged in the area that transitions to the flat, wall areas of guide elements 9, and into which the areas bordering recesses 14 of support elements 8 engage.

Recesses 14 of the support elements are arranged on projections 16 protruding towards the inside of the guide trough, so that the bottom and side outer walls 17 of the guide elements are spaced laterally or vertically away from the sides 18 of legs 10, 11, 12, which face towards the inside of the guide through.

Guide elements 9 are designed as profiles, which can be cut to length at will and manufactured by a continuous forming process, such as extrusion or continuous casting processes. Guide elements 9 have lateral and bottom guide areas 20, 21 combined in one piece. In this context, mounting projections 15 are integrally moulded on the ends of guide areas 20, 21 and simultaneously serve as reinforcing ribs or supports for the side straps 22 of the energy guiding chain, which are deposited at the same height. End sections 23 of the guide elements are angled outwardly.

Leg 11 facing wall 2 is taller than opposite leg 12 and essentially ends at the height of, or below the upper edge of guide elements 9. The mounting means on leg 11 are arranged above and below the mounting means on the guide elements, which are designed as projection 15.

Figure 2:
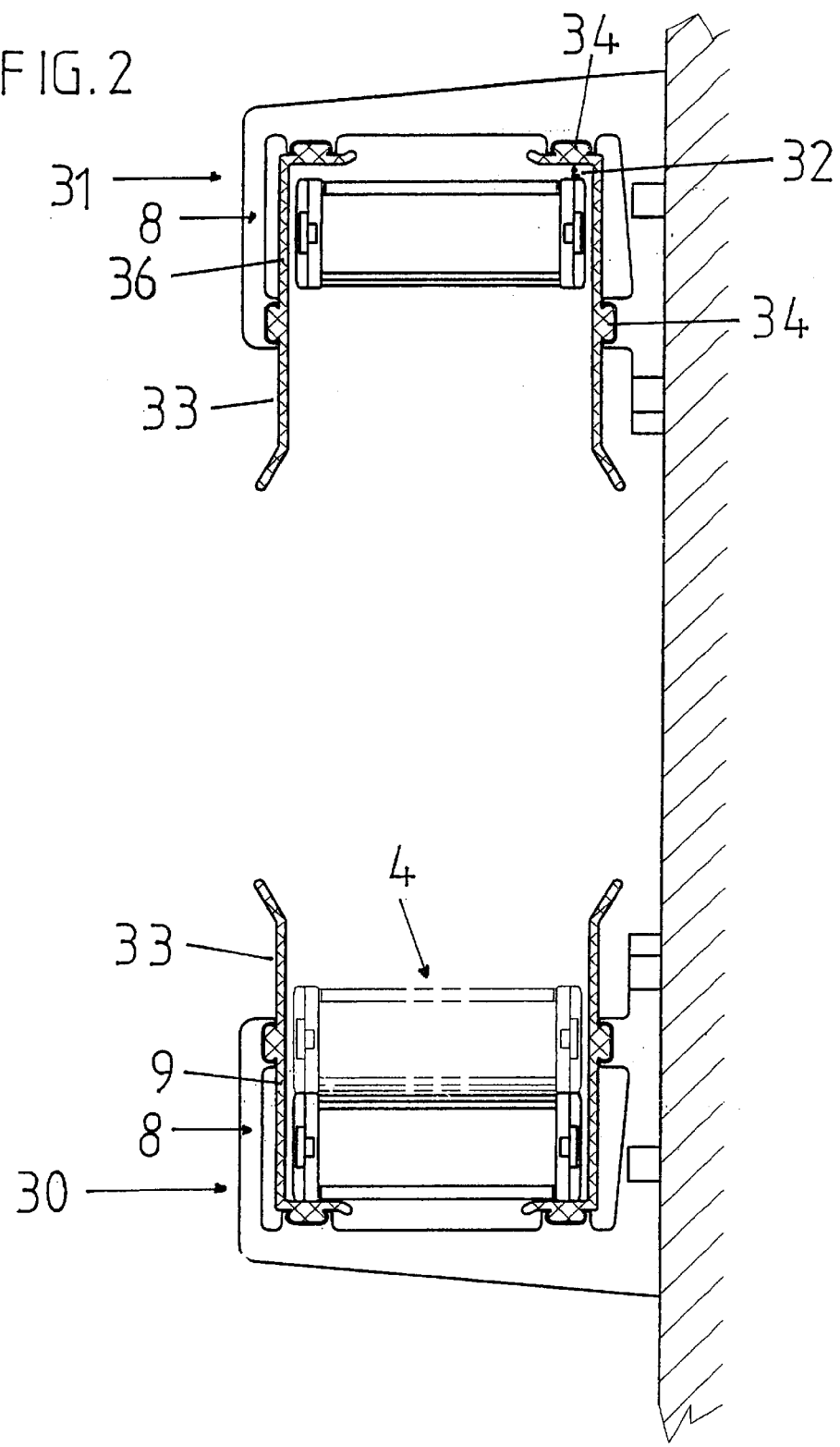

FIG. 2 shows a guide trough according to the invention with trough sections 30, 31, which are arranged below or above the energy guiding chain. Lower trough section 30 supports and laterally guides energy guiding chain 4, while upper trough section 31 surrounds the upper strand of the energy guiding chain in the deflection zone on the sides and with a certain amount of vertical spacing 32 at the top. This simultaneously ensures lateral guidance of the upper strand in the region of the deflection zone or, in the case of a self-supporting upper strand, over the full or partial length of the upper strand. In this context, guide trough sections 30 and 31 are of identical design.

Guide trough sections 30, 31 according to FIG. 2, which are of the same length and arranged in congruent fashion in the longitudinal direction of the guide trough, can be mounted on the vertical surface at a freely selectable vertical distance from each other and thus be adapted to different deflection radii.

Compared to the practical example in FIG. 1, guide elements 9 in FIG. 2 are taller due to longer end sections 33. Due to the matching position and design of mounting projections 15 and 34 of the guide elements according to FIGS. 1 and 2, they can be interchanged at will and mounted on identical support elements 8.

Figure 3:
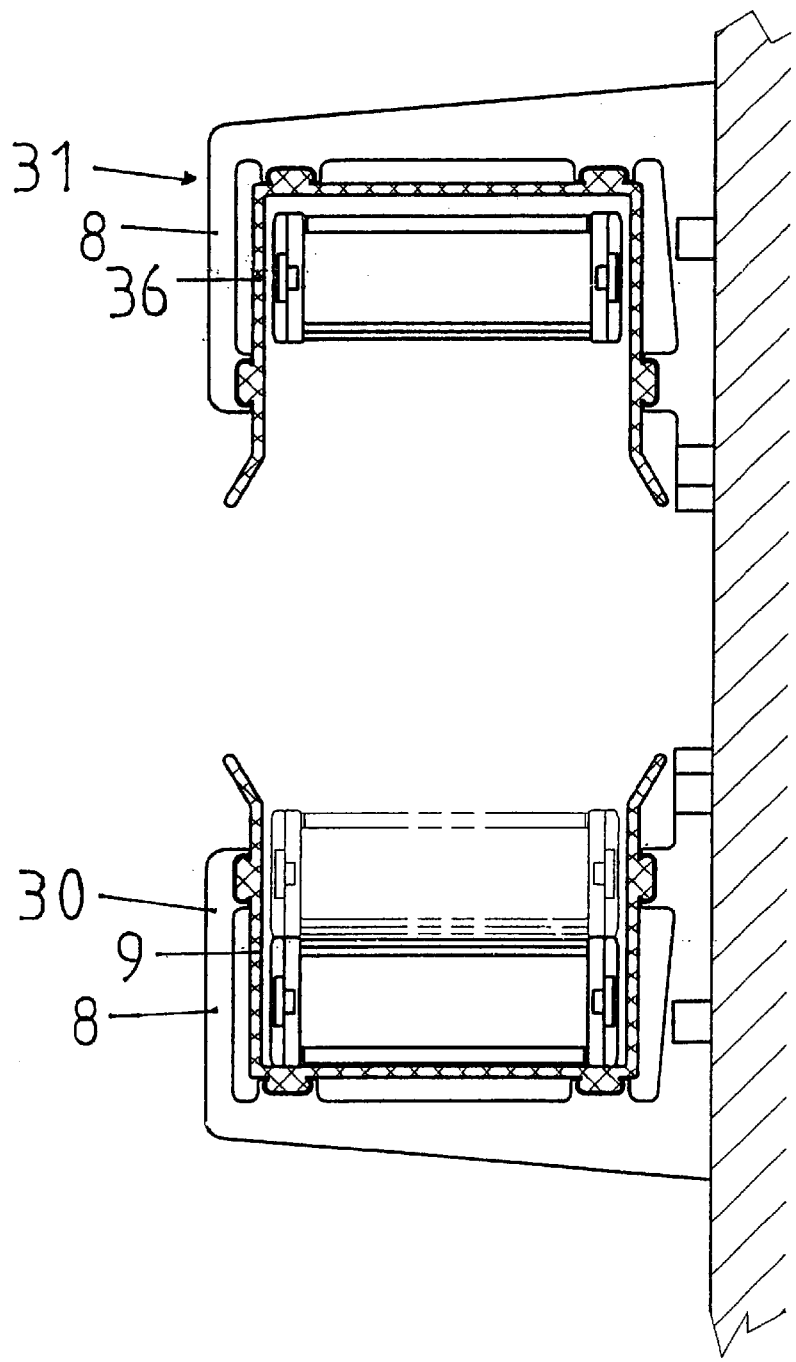

FIG. 3 shows a guide trough according to FIG. 2, in which 35 guide element 9 of lower guide trough section 30 is of U-shaped design. In all other respects, the guide trough is designed according to the practical examples in FIGS. 1 and 2, particularly with regard to the design of support elements 8 and the design of the mounting means for connecting the guide and support elements. Guide element 9 has a uniform cross-section over its entire length.

Due to guide elements 9, guide troughs can thus be designed with lateral and/or bottom wall areas that are continuous over the height and width of the guide trough, and over its length. Guide trough sections 30, 31, which are arranged below and above the energy guiding chain, can thus each serve to guard the energy guiding chain from external influences or foreign substances. The design of cover elements 36 of upper guide trough section 31 is identical to that of bottom guide elements 9. In order to completely guard the energy guiding chain according to FIG. 3, a cover profile can, if necessary, be provided, which bridges the vertical distance between guide and cover elements 9, 36 of upper and lower guide trough sections 30, 31 and can be mounted on the guide and cover elements and/or the support elements.

Figure 4:
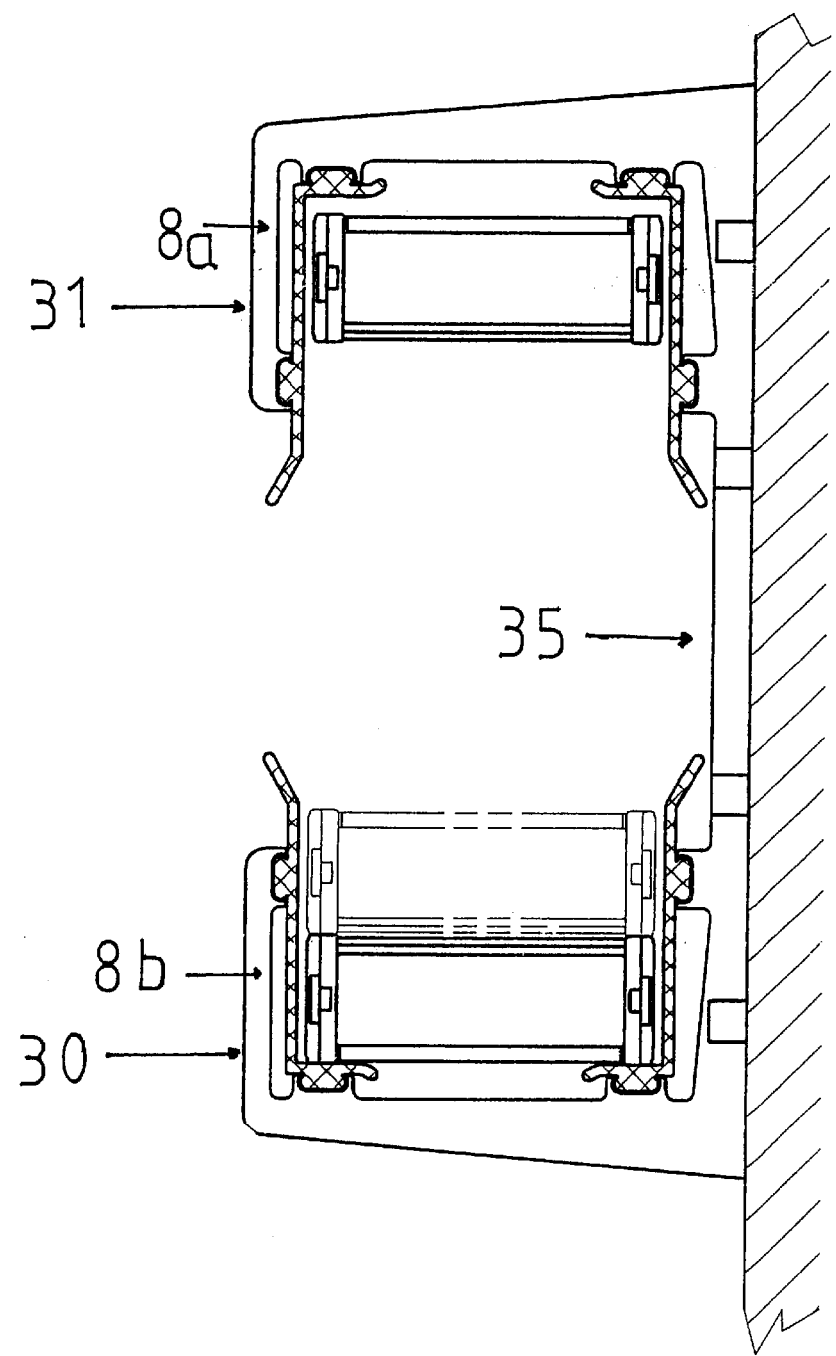
Figure 5B:
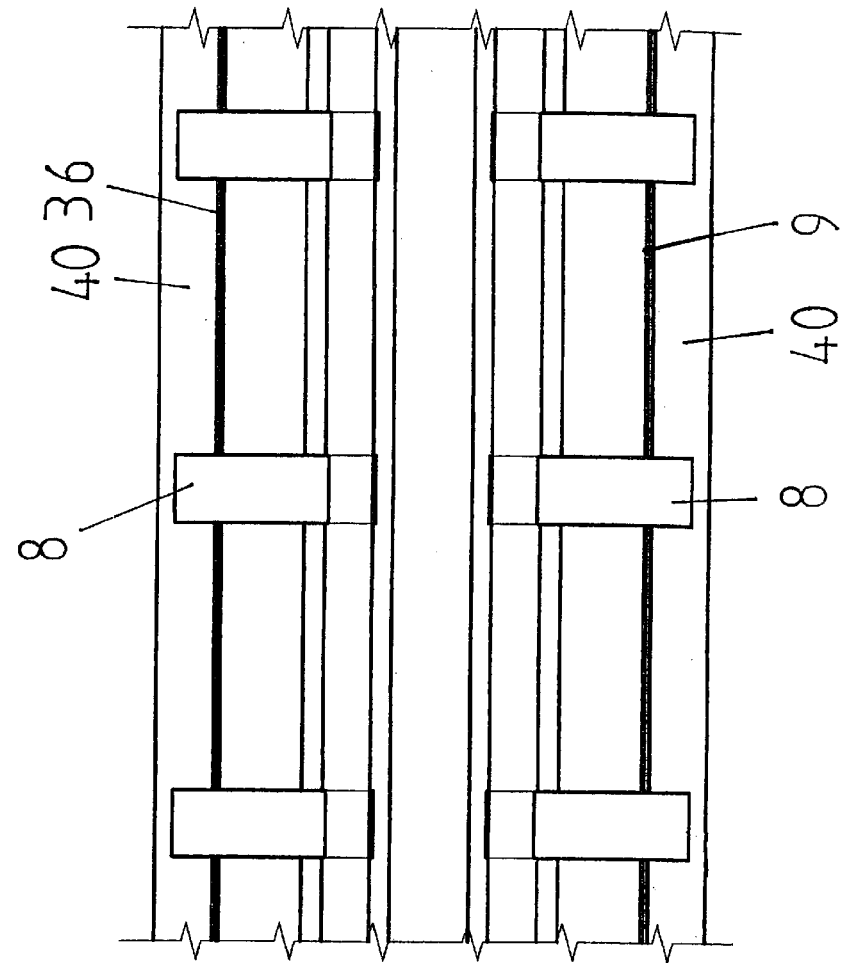
Figure 5A:
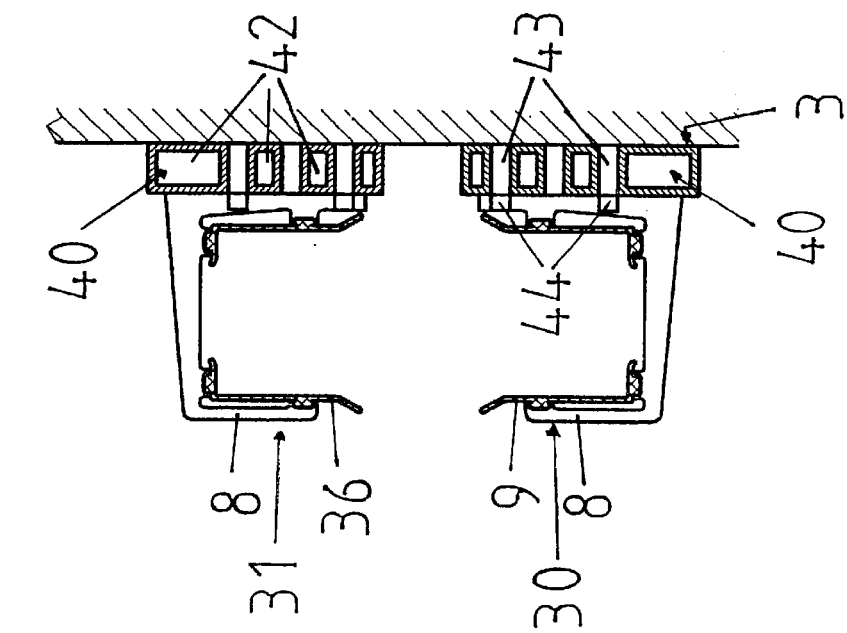

FIG. 4 shows a configuration of the guide trough according to FIG. 1 or 2, where, in contrast to these (the design of the guide trough otherwise being the same), support elements 8a, 8b of upper and lower guide trough sections 30, 31 are connected by middle section 35 to form a single piece. If necessary, middle section 35 can be replaced by a connector that can be mounted in detachable fashion on upper and lower support elements 8. Naturally, the guide and cover elements can again be U-shaped or of some other design here.

In the guide troughs according to the invention in FIGS. 5 and 6, which otherwise correspond to those in FIGS. 1 to 4, mounting profiles 40, 41 are provided for mounting support elements 8 on vertical surface 3. According to FIG. 5, upper and lower guide trough sections 30, 31 are each associated with separate mounting profiles 40, on which a number of support elements 8 are either mounted in detachable or permanent fashion, or integrally moulded, at a distance from one another in the longitudinal direction of the guide trough. Mounting profiles 40, 41 are designed as hollow profiles and equipped with hollow chambers 42, which extend in the longitudinal direction of the guide troughs, are closed in all circumferential directions, and open at the face end. Between the hollow chambers, there are through-holes 43, which can be arranged vertically to vertical surface 3 and serve to accommodate mounting elements, such as screws or the like, in order to be able to mount support profiles 8 on wall 2. If necessary, through-holes 44 in support elements 8 can be flush with the through-holes in the mounting profiles, so that a given mounting means can be used to connect a support element and a mounting profile to one another, or to the vertical surface. Of course, other suitable mounting means are also possible. For example, support elements and mounting profiles can be provided with corresponding, interacting, integrally moulded projections and recesses. Furthermore, the means for mounting the support elements on the mounting profiles can be designed such that the support elements can be shifted over sections, or over the entire length of the mounting profiles in the longitudinal direction of the same. The support elements can then be mounted at pre-defined or freely selected positions on the mounting profiles. Alternatively, the mounting means for connecting the mounting profiles to the vertical surface can be designed such that they can be arranged in freely selectable fashion at pre-defined positions, over sections, or over the entire length of the mounting profiles.

In contrast to the mounting profile in FIG. 5, the one according to FIG. 6 extends over the entire height of the guide trough and connects upper and lower guide trough sections 30, 31 to one another to form a single piece. For mounting on the vertical surface, a number of mounting means in the form of through-holes 45, which can be used to accommodate screws or the like, are provided in the middle region of the mounting profile at a distance from one another in the longitudinal direction of the mounting profile. Of course, other suitable mounting means can also be provided.

The mounting profiles and the guide elements can be cut to length as required and still retain their function. In particular, the guide elements, with the support elements mounted on them, or the mounting profiles, with the support elements mounted on them, or the support and guide elements mounted on them, can be cut to length as required and still retain their function.

Guide Trough

List of Reference Numbers

1 Guide trough
2 Wall
3 Vertical surface
4 Energy guiding chain
5 Upper strand
6 Lower strand
7 Link
8, 8a, 8b Support element
9, 9a, 9b Guide element
10, 11, 12 Leg
13 Widened section
14 Recess
15 Projection
16 Projection
17 Outer wall
18 Side
20, 21 Guide area
22 Side strap
23 End section
30, 31 Guide trough section
32 Spacing
33 End section
34 Projection
35 Middle section
36 Cover element
40, 41 Mounting profile
42 Hollow chamber
43, 44, 45 Through-hole

What is claimed is:

1. Guide trough for energy guiding chains, where the guide trough has parallel lateral guide elements and bottom guide elements, where the lateral guide elements are spaced apart laterally, where an energy guiding chain can be arranged in the guide trough and deposited between the lateral guide elements and on the bottom guide elements, and where a support structure with support elements is provided, on which the guide elements can be mounted, and where mounting devices for mounting the support elements on an essentially vertical surface are provided, characterised in that the support elements, and at least one guide element, selected from the group consisting of lateral and bottom guide element, have corresponding, integrally moulded means for mounting on one another.

2. A guide trough according to claim 1, characterised in that the support elements have at least one, essentially vertical rest for at least one of the lateral guide elements.

3. A guide trough according to claim 1, characterised in that the support structure has multiple support elements, which are each associated with one guide element, arranged to face one another, and separated in the longitudinal direction of the guide trough.

4. A guide trough according to claim 1, characterised in that the support elements have at least one lateral leg, which preferably extends essentially perpendicular to the longitudinal direction of the guide trough and parallel to the vertical surface, and has mounting means for mounting the respective support element on the vertical surface.

5. A guide trough according to claim 1, characterised in that the mounting means for connecting the support elements and the guide elements to each other are designed as corresponding projections and recesses.

6. A guide trough according to claim 5, characterised in that the projections extend in the longitudinal direction of the guide elements and are of strip-like design.

7. A guide trough according to claim 1, characterised in that at least one of the guide elements, selected from the group consisting of side and bottom guide elements, forms a continuous wall over its entire length, selected from the group consisting of side wall, bottom wall and combined side/bottom wall of the guide trough.

8. A guide trough according to claim 1, characterised in that the mounting means of the support elements and the guide elements project towards one another, and that the outside surfaces of the guide elements adjacent to the mounting means can be mounted on the support elements at a distance from them.

9. A guide trough according to claim 1, characterised in that the guide elements have lateral and bottom guide areas for guiding the energy guiding chain.

10. A guide trough according to claim 1, characterised in that guide elements of different dimensions in at least one direction, meaning the height or width of the guide elements, are provided and that the guide elements can be interchangeably mounted on a given support structure.

11. A guide trough according to claim 1, characterised in that support elements that can be mounted on the vertical surface are provided, which can be arranged on the top and/or side of an upper region of the energy guiding chain to be guided, and that cover elements that can be mounted on them are provided, which at least partially surround the side and/or top of the upper region of the energy guiding chain.

12. A guide trough according to claim 11, characterised in that the support elements positioned above and below the energy guiding chain to be guided are connected as a single piece.

13. A guide trough according to claim 1, characterised in that a long mounting profile extending in the longitudinal direction of the guide trough is provided, which is designed for mounting a number of support elements arranged in the longitudinal direction of the guide trough.

14. A guide trough according to claim 13, characterised in that the mounting profile has mounting devices for mounting on the vertical surface.

15. A guide trough according to claim 13, characterised in that the support elements can be shifted on the mounting profile at least in sections and at least in one direction, meaning a longitudinal direction or a transverse direction of the mounting profile, and that they can be mounted on the mounting profile.

16. A guide trough according to claim 13, characterised in that the mounting profile has mounting areas for mounting support elements arranged above and below the energy guiding chain to be guided.

17. A guide trough according to claim 13, characterised in that the mounting profile is designed as a hollow profile.

18. A guide trough according to claim 1, characterised in that at least one component of the guide trough, from the group consisting of support element, guide element and mounting element, is a profile that can be cut to length as required, such that the shortened profile includes mounting elements for mounting on the respectively corresponding component.

19. A guide trough according to claim 1, characterised in that a guide trough, consisting of at least support elements, guide elements and, optionally, mounting profiles, is pre-assembled.

20. A guide trough according to claim 19, characterised in that the pre-assembled guide trough includes a pre-assembled energy guiding chain.

* * * * *